UNITED STATES PATENT OFFICE.

LUDWIG BENDA, OF MAINKUR, NEAR FRANKFORT-ON-THE-MAIN, AND OTTO SIEVERS, OF FECHENHEIM, NEAR FRANKFORT-ON-THE-MAIN, GERMANY, ASSIGNORS TO I. G. FARBENINDUSTRIE AKTIENGESELLSCHAFT, A CORPORATION OF GERMANY.

BENZOXAZOLON ARSINE OXIDES.

No Drawing. Application filed June 19, 1925, Serial No. 38,328, and in Germany June 25, 1924.

We have found that by gently reducing the benzoxazolon arsonic acids disclosed in Patent No. 1,543,544 of June 23, 1925, the corresponding arsine oxides of the general formula:

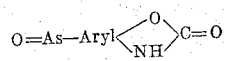

may be obtained without splitting the benzoxazolon ring.

These new arsine oxides show valuable therapeutic and prophylactic properties in the case of infection by spirochaetæ, which is all the more surprising as none of the arsine oxides hitherto known is of any medical use.

Example 1.

200 gr. benzoxazolon arsonic acid are dissolved at about 30° in 1000 cc. hydrochloric acid ten times normal. The solution is diluted with 1200 cc. water. A solution of 40 gr. potassium iodide in 400 cc. water is then added, whereby a partial precipitation of the new product takes place and the solution assumes a dark color (iodine). $SO_2$ is then passed in for several hours; the sediment and the liquor becomes discolored. The precipitate is then decanted by suction, washed well with water, mixed cold with 1000 cc. sodium carbonate solution double normal, decanted by suction, and again washed with water. It is then dissolved in 500 cc. water and 1500 cc. normal caustic soda solution, filtered, and the pure benzoxazolon arsine oxide precipitated from the filtrate with normal hydrochloric acid as a white powder; it is then decanted by suction, washed with water, alcohol and ether, and dried at a low temperature.

The new compound being probably benzoxazolon-6-arsine oxide of the formula:

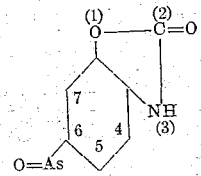

is sparingly soluble in water and alcohol; in contrast to the parent material it is also insoluble in a solution of sodium acetate; it is only very sparingly soluble in a cold sodium carbonate solution; dissolving very readily in a hot sodium carbonate solution, and also in a cold normal caustic soda solution.

The determination of arsenic yielded the following result: Precipitated 33% As. Corrected 33.3% As.

Example 2.

210 gr. 5-methylbenzoxazolon-6-arsonic acid are dissolved in 1600 cc. hydrochloric acid ten times normal. To this solution 1200 cc. water, and then, while stirring, a solution of 40 gr. potassium iodide in 400 cc. water is added. Sulphurous acid is passed into the mixture of reaction which has assumed a dark coloration, until saturated, during which operation it becomes discoloured. After decanting by suction and washing with water and cold dilute sodium carbonate solution the 5-methylbenzoxazolon-6-arsine oxide of the probable formula:

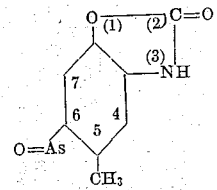

forms a colourless powder which for further precipitation may be redissolved from n-caustic soda solution, as it dissolves readily in cold caustic soda solution and also in a hot sodium carbonate solution. It is practically insoluble in a cold sodium carbonate solution, sodium acetate, water, alcohol and ether.

Example 3.

150 gr. benzoxazolon-5-arsonic acid are dissolved at about 30° in 3000 cc. hydrochloric acid decinormal. The solution is diluted with 600 cc. water. A solution of 30 gr. potassium iodide in 300 cc. water is then added whereby a partial separation of the new product takes place, the solution assuming a dark color (iodine). Sulphurous acid is then passed in for several hours; the precipitate and the liquid become discolored. The precipitate is then decanted by suction, washed with water, alcohol and ether and dried at a low temperature.

The new compound being probably benzoxazolon-5-arsine oxide of the formula:

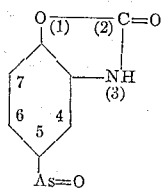

is hardly soluble in water and alcohol. In contradistinction to the isomeric compound it dissolves in a solution of sodium acetate and in a cold sodium carbonate solution, in a hot sodium carbonate solution and also in cold normal caustic soda solution it dissolves easily.

*Example 4.*

225 gr. 7-chlorobenzoxazolon-5-arsonic acid are dissolved in 1600 cc. hydrochloric acid ten times normal. The solution is diluted with 1200 cc. water and a solution of 40 gr. potassium iodide dissolved in 400 cc. water added. Sulphurous acid is passed into this mixture of reaction which has assumed a dark coloration, until saturated, during which operation it becomes discoloured. After decanting by suction and washing with water and dilute sodium carbonate solution the 7-chlorobenzoxazolon-5-arsine oxide of the probable formula:

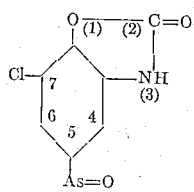

is obtained which for further purification may be redissolved from n-caustic soda solution. A colorless powder is formed which is practically insoluble in water, alcohol, ether and acetate, only very sparingly soluble in a cold sodium carbonate solution, but dissolving readily in cold and hot caustic soda solution.

Having now particularly described and ascertained the nature of our said invention and in what manner the same is to be performed, we declare, that what we claim is:

1. As new substances benzoxazolon arsine oxides of the general formula:

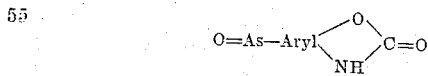

forming white powders insoluble or sparingly soluble in water, alcohol sodium carbonate and sodium acetate solution, readily soluble in a hot sodium carbonate solution and also in a cold caustic soda solution and being substantially identical with the compounds obtainable by gently reducing benzoxazolon arsonic acids.

2. As new substances benzoxazolon-5-arsine oxide bodies of the formula:

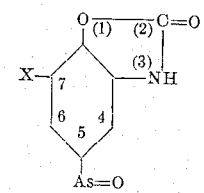

in which formula X means hydrogen, which may be replaced by a monovalent substituent, which compounds form white powders insoluble or sparingly soluble in water, alcohol, sodium carbonate and sodium acetate solution, readily soluble in a hot sodium carbonate solution and also in a cold caustic soda solution and being substantially identical with the compounds obtainable by gently reducing benzoxazolon arsonic acids of the formula:

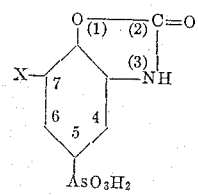

in which formula X means hydrogen, which may be replaced by a monovalent substituent.

3. As new substance: the 7-chlorobenzoxazolon-5-arsine oxide, its formula being:

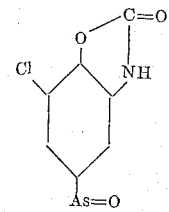

forming a white powder easily soluble in caustic alkalies and in a hot sodium carbonate solution, insoluble in cold sodium carbonate solution, water and alcohol, insoluble in a solution of sodium acetate.

In witness whereof we have hereunto signed our names this fourth day of June, 1925.

LUDWIG BENDA.
OTTO SIEVERS.